March 4, 1958
A. T. FLOWER
2,825,751
SPACER BAR FOR CONDUCTOR WIRES
Filed March 26, 1954
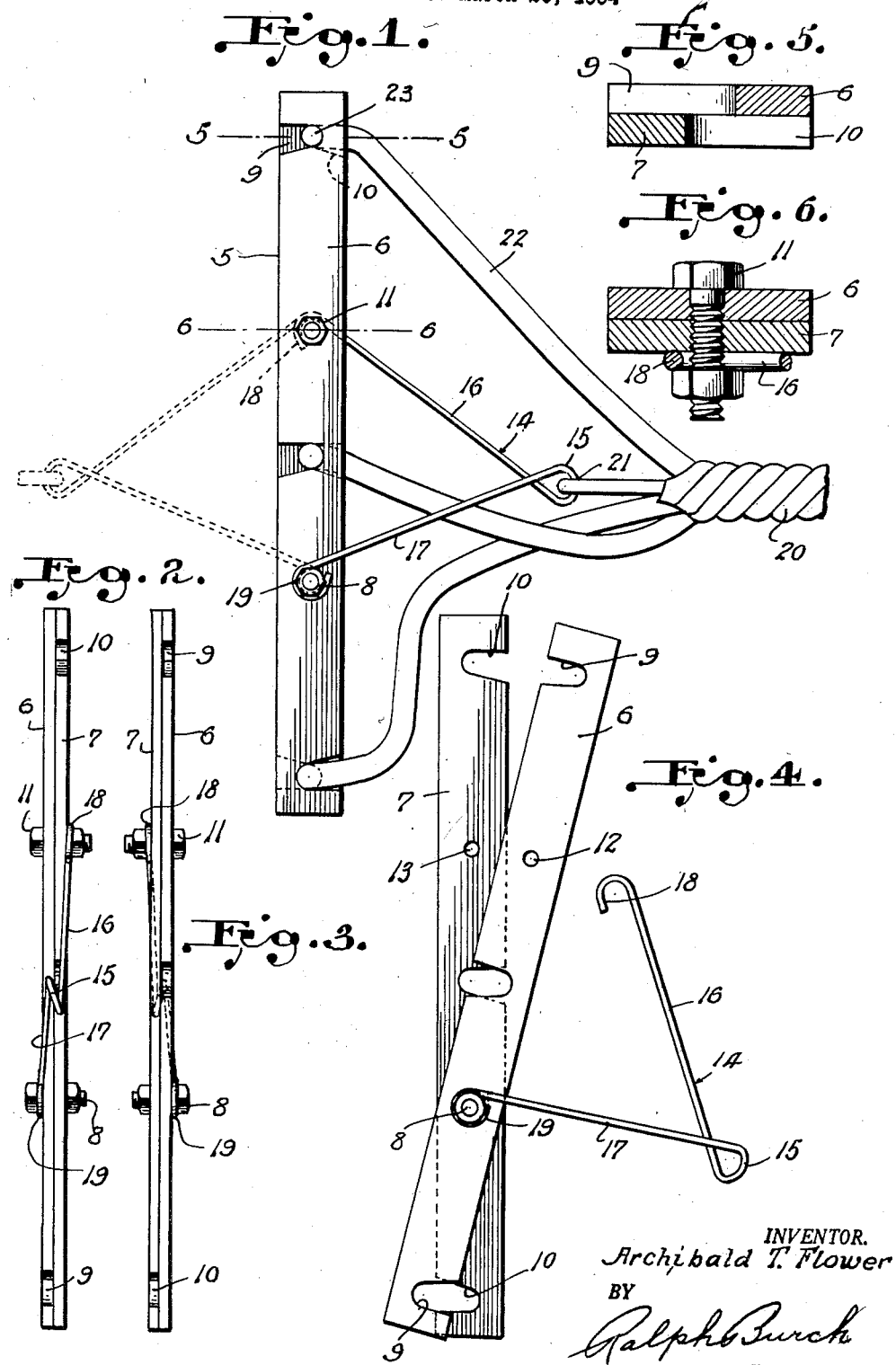
INVENTOR.
Archibald T. Flower
BY
Ralph Burch
ATTORNEY.

United States Patent Office 2,825,751
Patented Mar. 4, 1958

2,825,751
SPACER BAR FOR CONDUCTOR WIRES

Archibald Thomas Flower, Glenside, Pa.

Application March 26, 1954, Serial No. 418,972

4 Claims. (Cl. 174—146)

This invention relates to spacer bars for electric conductor wires.

It is an object of the invention to provide a spacer bar which may be readily applied or removed from conductor wires and which may serve as a support for service lines leading from the conductor wires.

A further object of the invention resides in providing a spacer bar composed of a pair of members, pivotally connected in crossed relation, with cooperating slots in their longitudinal edges to receive conductor wires and hold the wires in spaced relation when the members are swung into parallel relation.

A still further object of the invention resides in providing a spacer bar composed of pivoted members having cooperating slots in their longitudinal edges to receive and hold conductor wires and a bail extending laterally from the bar for supporting a service line connected to the conductor wires.

Another object of the invention resides in providing a device of the above-mentioned character which is simple and durable in construction, reliable and efficient in use and inexpensive to manufacture.

Other objects and advantages of the invention will be apparent during the course of the following description.

In the accompanying drawing forming a part of this specification and in which like numerals are employed to designate like parts throughout the same, Fig. 1 is a side elevational view of the spacer bar applied to conductor wires, Fig. 2 is an edge view of the bar looking from the right side of Fig. 1, Fig. 3 is an edge view of the same looking from the left side of Fig. 1, Fig. 4 is a side elevational view of the bar in open position, Fig. 5 is a section taken on line 5—5 of Fig. 1, and, Fig. 6 is a section taken on line 6—6 of Fig. 1.

Referring to the drawing wherein for the purpose of illustration a preferred embodiment of the invention is shown the numeral 5 denotes generally the spacer bar which is composed of a pair of elongated flat bars or strips of plastic material 6 and 7, such as fibreglass reinforced polyester sheets or other suitable insulating material. The bars 6 and 7 are pivotally connected together in superimposed relation by a bolt 8 between the center and one end of the bars which permits the bars to pivotally swing from and towards each other. Each bar is provided with spaced slots 9 and 10, the slots of each bar above and below the pivotal connection 8 being respectively formed in opposite edges of the bars, the slots of one bar being in reverse relation to the slots of the other bar so the slots of one bar register with the slots of the other bar when the bars are swung together. The slots above the pivotal connection have their lower edges inclined downwardly while the slots below the pivotal connection have their upper edges inclined upwardly. To secure the bars in superimposed relation a bolt 11 is inserted through openings 12 and 13 formed in the bars above the pivotal connection. A bail 14 is formed from a piece of wire bent to provide an eye 15 and arms 16 and 17 having loops 18 and 19 at their free ends for engagement with the bolts 11 and 8, respectively. The loop 19 is a closed loop while the loop 18 is open for ready attachment and detachment from the bolt 11. The arm 16 is longer than the arm 17 so that the eye 15 is disposed in a plane below the center slots of the bars. A service line 20 is connected at 21 to the eye 15 of the bail and the three wires 22 of the service line are connected to the conductor wires 23 held in spaced relation by the spacer bar. If desired a second bail may be extended from the opposite side of the spacer bar, as shown in dotted lines in Fig. 1.

To apply the spacer bar to the conductor wires 23, the bolt 11 is removed allowing the bars 6 and 7 to be swung to a position in crossed relation, as shown in Fig. 4. The wires 23 are engaged in the slots of one of the bars 6 or 7 and then the bars are swung towards each other to bring the bars into superimposed relation whereby the wires are confined within the slots of both bars. The bolt 11 is then inserted through the openings 12 and 13 of the bars to hold them together. If it is desired to connect a service line 20 to the conductor wires, the bail 14 is attached to the bolts 8 and 11 so as to extend laterally from the spacer bar. The service line 20 is connected to the eye 15 of the bail and the wires 22 of the service line are connected to the conductor wires 23. As the eye 15 of the bail is disposed on a plane below the center of the spacer bar the pull of the service line on the bail holds the spacer bar in an upright position. Also the bail distributes the load on the spacer bar so there is no excessive strain on any of the conductor wires.

It is to be understood that the form of the invention herein shown and described is a preferred example of the same and changes in the shape, size and arrangement of the parts may be made without departing from the spirit of the invention or scope of the claims.

Having thus described my invention, I claim:

1. A spacer bar for conductor wires comprising a pair of straight bars disposed in superimposed relation, the longitudinal edges of each bar having a series of slots disposed in inverse relation to the slots of the other bar extending at right angles to the longitudinal axis of said bars with the inner end of the slots of each bar registering with the inner end of the slots of the other bar to provide openings for reception of the conductor wires, bolts on opposite sides of the intermediate slots of said bars connecting said bars together in superimposed relation, and a bail of substantially V-shape having an eye at its apex and hooks at its free ends for engagement with said bolts to support the bail in laterally extended relation to the edges of said bars, one of said bolts being removable to permit said bars to swing apart in crossed relation to release the conductor wires.

2. A spacer bar for conductor wires comprising a pair of elongated bars disposed in superimposed parallel relation, each bar having a series of spaced slots opening through an edge of the bar and extending at right angles to the longitudinal axis of said bars with the slots of each bar in inverse relation to the slots of the other bar and of such length that the closed ends of the slots of one bar register with the closed ends of the slots of the other bar to provide openings through the bars for the passage of the conductor wires and a bail formed of wire having a central portion to support service cables connected to the conductor wires and a pair of arms extending from said central portion in diverging relation with the ends of said arms disposed on opposite sides of said pair of bars and connected thereto intermediate the conductor openings.

3. A spacer bar for conductor wires comprising a pair of elongated bars disposed in superimposed parallel relation, each bar having a series of spaced slots opening through an edge of the bar and extending at right angles to the longitudinal axis of said bars with the slots of each bar in inverse relation to the slots of the other bar and of such length that the closed ends of the slots of one bar register with the closed ends of the slots of the other bar to provide openings through the bars for the passage of the conductor wires, a bail formed of wire having a central portion to support service cables connected to the conductor wires and a pair of arms extending from said central portion in diverging relation with the ends of said arms disposed on opposite sides of said pair of bars and means detachably connecting the ends of said arms to said bars intermediate the conductor openings.

4. A spacer bar for conductor wires comprising a pair of elongated flat insulation bars, means pivotally securing said bars together in superimposed relation, each bar having spaced slots opening through one edge of the bar on one side of the pivot means and a slot opening through the opposite edge of the bar on the opposite side of the pivot means, said slots extending inwardly across the longitudinal axis of the bar with the slots of each bar in inverse relation to the slots of the other bar whereby the closed ends of the slots of one bar register with the closed ends of the slots of the other bar when the bars are in parallel relation forming openings for the passage of the conductor wires, removable means for securing said bars in parallel relation, and a bail extending laterally from the edges of said bars having one end secured to one outer face of said bars by said pivot means and its other end secured to the opposite outer face of said bars by said removable means.

References Cited in the file of this patent

UNITED STATES PATENTS

| | | |
|---|---|---|
| 443,622 | Amos | Dec. 30, 1880 |
| 512,722 | Landis | Jan. 16, 1894 |
| 1,481,517 | Kurz | Jan. 22, 1924 |
| 1,688,015 | Hawley | Oct. 16, 1928 |
| 2,231,462 | Cobb | Feb. 11, 1941 |
| 2,430,544 | Walker | Nov. 11, 1947 |
| 2,508,912 | Ginns | May 23, 1950 |
| 2,560,723 | Hansen | July 17, 1951 |
| 2,677,717 | Winn | May 4, 1954 |